United States Patent [19]

Morris et al.

[11] Patent Number: 5,037,946

[45] Date of Patent: Aug. 6, 1991

[54] COPOLYESTERS FROM 4,4'-BIPHENYLDICARBOXYLIC ACID, 1,6-HEXANEDIOL AND ETHYLENE GLYCOL

[75] Inventors: John C. Morris; Winston J. Jackson, Jr., both of Kingsport, Tenn.

[73] Assignee: Eastman Kodak Company, Rochester, N.Y.

[21] Appl. No.: 567,508

[22] Filed: Aug. 15, 1990

Related U.S. Application Data

[62] Division of Ser. No. 289,347, Apr. 23, 1988, Pat. No. 4,973,654.

[51] Int. Cl.$^5$ .............................................. C08G 63/20
[52] U.S. Cl. ..................................... 528/272; 528/274; 528/275; 528/285; 528/293; 528/308.6; 525/437; 525/444; 525/445; 525/449; 525/450
[58] Field of Search ............... 528/272, 274, 275, 285, 528/286, 293, 308.6; 525/437, 444, 445, 449, 450

[56] References Cited

U.S. PATENT DOCUMENTS

| | | | |
|---|---|---|---|
| 2,657,194 | 10/1958 | Butler et al. | 528/301 |
| 2,976,266 | 3/1961 | Lytton et al. | 528/280 |
| 3,030,335 | 4/1962 | Goldberg | 528/85 |
| 3,190,764 | 6/1965 | Cardina | 427/333 |
| 3,247,043 | 4/1966 | Cardina | 156/314 |
| 3,317,466 | 5/1967 | Caldwell et al. | 528/190 |
| 3,842,040 | 10/1974 | Browne et al. | 528/364 |
| 3,842,041 | 10/1974 | Browne et al. | 528/279 |
| 4,073,777 | 2/1978 | O'Neill et al. | 528/295 |
| 4,728,717 | 3/1988 | Morris et al. | 528/306 |
| 4,728,718 | 3/1988 | Morris et al. | 528/306 |
| 4,728,719 | 3/1988 | Morris et al. | 528/306 |
| 4,728,720 | 3/1988 | Morris et al. | 528/306 |
| 4,739,033 | 4/1988 | Morris et al. | 528/306 |
| 4,742,151 | 5/1988 | Tate et al. | 528/272 |

Primary Examiner—John Kight, III
Assistant Examiner—Sam A. Acquah
Attorney, Agent, or Firm—Thomas R. Savitsky; Mark A. Montgomery; William P. Heath, Jr.

[57] ABSTRACT

Disclosed are copolyesters comprising an acid component of 4,4'-biphenyldicarboxylic acid and a glycol component comprising 1,6-hexanediol and ethylene glycol. Injection-molded bars of the copyesters exhibit unusually high stiffness and tensile strength compared to polyesters described in the art.

10 Claims, No Drawings

COPOLYESTERS FROM 4,4'-BIPHENYLDICARBOXYLIC ACID, 1,6-HEXANEDIOL AND ETHYLENE GLYCOL

This is a divisional of copending application Ser. No. 07/289,347 filed on Dec. 23, 1988, U.S. Pat. No. 4,973,654.

FIELD OF INVENTION

The present invention concerns copolyesters from 4,4'-biphenyldicarboxylic acid, 1,6-hexanediol and ethylene glycol that have unusually high stiffness and tensile strength properties.

BACKGROUND OF THE INVENTION

U.S. Pat. No. 2,976,266 broadly discloses copolyesters prepared from 4,4'-biphenyldicarboxylic acid and certain aliphatic glycols. Copolyesters of 4,4'-biphenyldicarboxylic acid (BDA), 1,6-hexanediol (HD), and ethylene glycol (EG) are broadly disclosed in column 2, line 70 of U.S. Pat. No. 2,976,266 in a general listing along with other aliphatic glycols useful in this disclosed invention. The copolyester of BDA, HD, and EG is not specifically disclosed. U.S. Pat. No. 3,842,040 and U.S. Pat. No. 3,842,041 disclose the homopolyester of 4,4'-biphenyldicarboxylic acid and ethylene glycol.

U.S. Pat. No. 4,742,151 discloses ultra-high-molecular weight polyesters prepared from aromatic dicarboxylic acids and alkylene glycols containing from 2 to 6 carbons having an intrinsic viscosity greater than 1.5. 4,4'-Biphenyldicarboxylic acid is disclosed in a list of dicarboxylic acids useful to the disclosed invention.

German Offenlegungsschrift, DE 1935252, discloses polyesters of two aromatic dicarboxylic acids which include 10 to 50 mol % 4,4'-biphenyldicarboxylic acid, 50 to 90 mol % of terephethalic acid and the two glycols ethylene glycol and 1,4-cyclohexanedimethanol.

Japanese patent, Kokai Tokkyo Koho JP 57/198726 discloses copolyesters containing 25-80 mol % 4,4'-biphenyldicarboxylic acid with various aliphatic glycols and aromatic dicarboxylic acids.

Homopolyesters of 4,4'-biphenyldicarboxylic acid and certain aliphatic glycols are disclosed in journal literature. Homopolyesters of 4,4-biphenyldicarboxylic acid and ethylene glycol, 1,4-butanediol, and 1,6-hexanediol are disclosed by Meurisse et al., in the *British Polymer Journal*, Volume 13, page 57 (1981) (Table 1). Jackson and Morris include a review of homopolyesters from 4,4'-biphenyldicarboxylic acid and various aliphatic glycols in the *Journal of Applied Polymer Science, Applied Polymer Symposia*, 41, 307-326 (1985). Krigbaum et al., disclose relatively low molecular weight homopolyesters from 4,4'-biphenyldicarboxylic acid and various aliphatic glycols in the *Journal of Applied Polymer Science, Polymer Letters Edition*, 20, 109-115 (1982). Low molecular weight homopolyesters of 4,4'-biphenyldicarboxylic acid are also disclosed by Wanatabe et al., *Macromolecules*, 21(1), p. 278-280 (1988), and Krigbaum et al., *Polymer*, 24(10), p. 1299-1307. Jpn. Kokai Tokkyo Koho JP 6,236,821 [86,236,821] (1986) also discloses low molecular weight polyesters from 4,4'-biphenyldicarboxylic acid and 1,4-butanediol prepared below their melting temperatures in a nonvolatile liquid. Polyesters of 1,6-hexanediol and 4,4'-biphenyldicarboxylic acid are disclosed in *Kobunshi Ronbunshu*, Vol. 44(12), 983-986 (December 1987) having limiting viscosity number of about 0.31.

Heretofore, copolyesters from 4,4'-biphenyldicarboxylic acid, ethylene glycol and 1,6-hexanediol have been unknown.

SUMMARY OF THE INVENTION

The present invention is directed to a copolyester comprising
(A) an acid component comprising repeating units of at least 80 mol % 4,4'-biphenyldicarboxylic acid, and
(B) a glycol component comprising repeating units of from about 95-25 mol % 1,6-hexanediol, and about 5-75 mol % ethylene glycol.
wherein the total mol % of acid component and glycol component are each 100 mol %.

The present invention is also directed to a composition comprising:
(i) about 30 to 99 weight percent of the copolyester of the present invention, and
(ii) about 1 to 70 weight percent of at least one property modifier.

DETAILED DESCRIPTION OF THE INVENTION

The prior art describes molding, spinning, and film extrusion as viable processes for shaping polyesters based on 4,4'-biphenyldicarboxylic acid. We have discovered a range of polyester compositions within this broad disclosure based on 4,4'-biphenyldicarboxylic acid, 1,6-hexanediol, and ethylene glycol having exceptionally high tensile strength.

Injection-molded bars comprising at least 80 mol % 4,4'-biphenyldicarboxylic acid units, 90 to 25 mol % 1,6-hexanediol units, and 10 to 75 mol % ethylene glycol units have a combination of surprisingly high tensile strength and flexural modulus. The homopolyester in Table 1 (of the Examples contained herein) of 4,4'-biphenyldicarboxylic acid and 1,6-hexanediol, having an I.V. of about 1.14, has a tensile strength of about 12,000 pounds per square inch (psi) and a modulus of about 600,000 psi. Modification of the homopolyester of BDA and 1,6-hexanediol with 10 mol % of ethylene glycol raises the tensile strength from about 12,000 psi to 15,000-18,000 psi. The homopolyester of ethylene glycol with BDA melts at about 350° C. and is too high melting to mold without problems of severe decomposition.

Many of the copolyesters of our invention exhibit exceptionally high flexural modulus. Unlike the homopolyester disclosed by Meurisse which has a modulus of about 600,000 psi, the copolyesters of our invention containing more than about 35 mol % ethylene glycol units typically have moduli above about 1,000,000 psi. For example, the copolyester containing 100 mol % 4,4'-biphenyldicarboxylic acid units, 65 mol % 1,6-hexanediol units, and 35 mol % ethylene glycol units has a flexural modulus of 1,120,000 psi, the copolyester of 100 mol % 4,4'-biphenyldicarboxylic acid units, 53 mol % 1,6-hexanediol units, and 47 mol % ethylene glycol units has a flexural modulus of 1,540,000 psi, and the copolyester of 100 mol % 4,4'-biphenyldicarboxylic acid units, 36 mol % 1,6-hexanediol units, and 64 mol % ethylene glycol units has a flexural modulus of 1,670,000 psi.

The polyesters of our invention also have excellent solvent resistance. Molded bars are substantially unaffected after exposure for 24 hours in a variety of solvents which include toluene, 1,2-dichloroethane, methyl isobutyl ketone, ethyl acetate, ethanol, water, sulfuric acid, 10% sodium hydroxide, gasoline, acetone, acetic acid, 5% Clorox bleach, 50/50 water/ethanol, benzyl alcohol, nitric acid and methylene chloride.

The copolyesters of this invention are prepared from 4,4'-biphenyldicarboxylic acid and/or its esters, 1,6-hexanediol, and ethylene glycol. Examples of useful aromatic esters are the dimethyl, diethyl, dibutyl, and diphenyl esters or any combination of mixed esters. The polyesters may be prepared from glycol esters of BDA. The polyesters may be prepared in the melt or in the solid phase or by a combination of these processes. The inherent viscosity of the polymers is at least about 0.60, but preferably greater than about 1.0, and most desirably greater than about 1.20. Polyesters containing more than about 80 mol % ethylene glycol units have melting points above 320° C., making the polymers difficult to process without excessive thermal decomposition in the melt.

In the copolyester of the present invention it is preferred that the acid component is about 100 mol % of 4,4'-biphenyldicarboxylic acid. It is also preferred that the glycol component is about 90-25 mol % 1,6-hexanediol and about 10-75 mol % ethylene glycol, more preferred is about 35-65 mol % 1,6-hexanediol and about 35-65 mol % ethylene glycol.

The acid portion of the polyester of the invention (component (A)) may be substituted with less than about 20 mol %, but preferably, less than about 10 mol % of other aromatic dicarboxylic acids having up to 20 carbon atoms. Examples of suitable aromatic dicarboxylic acids include terephthalic, isophthalic, 1,5-, 2,6-, 2,7-naphthalenedicarboxylic, or trans-4,4'-stilbenedicarboxylic acids.

Likewise, the glycol portion of the polyester (component (B)) may be substituted with less than about 10 mol % of other aliphatic glycols having 3 to 20 carbon atoms so long as the high tensile strength and flexural modulus remain substantially unaffected. Examples of useful glycols are 1,2-propanediol, 1,3-propanediol, 1,4-butanediol, 1,5-pentanediol, cis- or trans-1,3- or 1,4-cyclohexanedimethanol, and p-xylene glycol.

The copolyesters of the present invention preferably have tensile strengths of greater than about 12,000 psi; more preferably the polyesters have a tensile strength of greater than about 15,000 psi and a flexural modulus of greater than about 600,000 psi.

In the composition of the present invention it is preferred that component (i) is present in an amount of about 50 to about 95 weight percent, and component (ii) is present in an amount of about 5 to about 50 weight percent.

In the composition of the present invention it is preferred that component (ii) is a property modifier selected from polyamides such as nylon 6,6 from Du Pont, poly(ether-imides) such as ULTEM a poly(ether-imide) from General Electric, polyphenylene oxides such as poly(2,6-dimethylphenylene oxide) or poly(phenylene oxide)/polystyrene blends such as the NORYL resins from General Electric, polyesters, polyphenylene sulfides, polyphenylene sulfide/sulfones, poly(estercarbonates), polycarbonates such as LEXAN a polycarbonate from General Electric, polysulfones, polysulfone ethers, and poly(ether-ketones) of aromatic dihydroxy compounds. The aromatic dihydroxy compounds used to prepare these polymers are disclosed in, for example, U.S. Pat. Nos. 3,030,335 and 3,317,466.

Component (ii) of the composition of this invention may also be conventional flame retardants such as a phosphorus compound, a halogen compound, a halogen compound in combination with an antimony compound, or fillers such as talc or mica, or reinforcing agents such as glass fiber, KELVAR (a poly(1,4-phenylene terephthalamide)), or carbon fiber.

It is preferred that the copolyester and/or composition of the present invention is in the form of a fiber, a film, a container, or a molded object.

The following examples are to illustrate the invention but should not be interpreted as a limitation thereon.

Inherent viscosities are determined at 25° C. in 25/35/40 (wt./wt./wt.) phenol/tetrachloroethane/p-chlorophenol at a concentration of 0.1 gram (g)/100 milliliters (mL). The melting points of the copolymers is determined using a Perkin-Elmer DSC 2B Differential Scanning Calorimeter at a scan rate of 20° C./minute. Compositions are determined using proton nuclear magnetic resonance spectroscopy (NMR).

The BDA polyesters are ground to pass a 3-millimeter (mm) screen, dried at 80°–100° C. in a vacuum oven for 24 hours and injection-molded on a Boy 22S molding machine to give 1/16-inch (in.) thick D1822 Type L tensile bars and ⅛×½×5-inch flexure bars. The tensile strength is determined following the procedure of ASTM D638 and the flexural modulus is determined according to ASTM D790.

EXAMPLE 1

This example illustrates the preparation of the copolyester consisting of 100 mol % 4,4'-biphenyldicarboxylic acid units, 53 mol % 1,6-hexanediol units, and 47 mol % ethylene glycol units.

A mixture of 216.0 g (0.80 mol) dimethyl 4,4'-biphenyldicarboxylate, 56.6 g (0.48 mol) 1,6-hexanediol, 74.4 g (1.20 mols) ethylene glycol, and 0.14 g titanium tetraisopropoxide is placed in a 1-liter flask equipped with an inlet for nitrogen, a metal stirrer, and a short distillation column. The flask is heated at 190° C. for about 3 hours, at 220° C. for about 1 hour, finally at 260° C. for 1 hour. A vacuum of 0.5 mm is gradually applied over the next 5 minutes. Full vacuum is maintained for about 1 hour. A high melt viscosity, white crystalline polymer is obtained with an inherent viscosity (I.V.) of 1.07 and a melting endotherm measured by DSC at 264° C.

The polymer is injection molded at 240° C. to give tensile bars with 36,700 psi tensile strength and a flexural modulus of 1,680,000 psi.

The other examples in Table 1 are prepared and injection-molded in a similar manner. The copolyesters of Table 1 have an acid component of 100 mol % BDA.

TABLE 1

| | | | | | | | |
|---|---|---|---|---|---|---|---|
| 4,4'-Biphenyldicarboxylic Acid/1,6-Hexanediol/Ethylene Glycol Copolyesters | | | | | | | |
| HD, Mol % | EG Mol % | DSC, °C.[a] | Molding Temp. °C.[b] | Molding I.V., | | Tensile Strength, psi | Flexural Modulus, × 10⁵ psi |
| | | | | Before | After | | |
| 100[c] | 0 | 217 | 210 | 1.14 | 1.11 | 10000 | 6.0 |
| 100[c] | 0 | 217 | 220 | 1.14 | 1.04 | 11300 | 5.1 |

TABLE 1-continued

| | | | | | | Tensile | Flexural |
| | | | | | | Strength, | Modulus, |
| HD, | EG | DSC, | Molding | \multicolumn{2}{c|}{Molding I.V.,} | | |
| Mol % | Mol % | °C.[a] | Temp. °C.[b] | Before | After | psi | × 10[5] psi |
|---|---|---|---|---|---|---|---|
| 95 | 5 | 210 | 210 | 1.37 | 1.37 | 21700 | 7.8 |
| 90 | 10 | 203 | 220 | 1.14 | 1.14 | 17700 | 7.2 |
| 89 | 11 | 203 | 255 | 1.22 | 1.05 | 14900 | 5.2 |
| 77 | 23 | — | 220 | 1.19 | 1.19 | 18500 | 9.6 |
| 76 | 24 | 187 | 275 | 1.06 | 0.95 | 15100 | 5.6 |
| 65 | 35 | — | 220 | 1.31 | 1.24 | 28200 | 11.2 |
| 54 | 46 | 264 | 240 | 1.11 | 1.13 | 35500 | 11.0 |
| 53 | 47 | — | 240 | 1.07 | 0.99 | 36700 | 15.4 |
| 36 | 64 | 287 | 280 | 1.08 | 0.86 | 36500 | 16.7 |
| 25 | 75 | 310 | 320 | 1.39 | 0.71 | 30500 | 14.1 |

[a]Melting point in °C. as determined by Differential Scanning Calorimetry.
[b]The molding temperature is the set temperature of the last two zones of the Boy 22S molding machine. The actual melt temperatures are about 20-30° C. higher than the molding temperatures.
[c]This polymer is disclosed by Meurisse in Brit. Poly. J., Vol. 13, p. 57 (1981) and has an I.V. of 0.94 in his solvent system.

The invention has been described in detail with particular reference to preferred embodiments thereof, but it will be understood that variations and modifications can be effected within the spirit and scope of the invention.

We claim:

1. A composition comprising:
   (i) about 30 to 90 weight percent of a copolyester comprising
      A. an acid component comprising repeating units of at least 80 mol % 4,4'-biphenyldicarboxylic acid, and
      B. a glycol component comprising repeating units of about 95-25 mol % 1,6-hexanediol, and about 5-75 mol % ethylene glycol
      wherein the total mol % of acid component and glycol component are each 100 mol %, and
   (ii) about 1 to 70 weight percent of at least one property modifier selected from polyamides, poly(ether-imides), polyphenylene oxides, polyphenylene oxide/polystyrene blends, different polyesters, polyphenylene sulfides, polyphenylene sulfide/sulfone blends, poly(estercarbonates), polycarbonates, polysulfone ethers, poly(ether-ketones) of aromatic dihydroxyl compounds, phosphorus compounds, halogen compounds, halogen compounds in combination with antimony compounds, talc, mica, poly(1,4-phenylene terephthalamide), glass fibers, or carbon fibers.

2. The composition of claim 1 wherein component (i) is present in an amount of about 50 to about 95 weight percent, and component (ii) is present in an amount of about 5 to about 50 weight percent.

3. The composition according to claim 1 wherein the acid component of the copolyester of (i) is about 100 mol % of 4,4'-biphenyldicarboxylic acid.

4. The composition according to claim 1 wherein the glycol component of the copolyester of (i) is about 90-25 mol % 1,6-hexanediol and about 10-75 mol % ethylene glycol.

5. The composition according to claim 3 wherein the glycol component of the copolyester of (i) is about 90-25 mol % 1,6-hexanediol and about 10-75 mol % ethylene glycol.

6. The composition according to claim 1 wherein the glycol component of the copolyester comprises greater than about 35 mol % of ethylene glycol.

7. The composition according to claim 1 wherein the glycol component of the copolyester comprises greater than about 35 mol % of ethylene glycol.

8. The composition according to claim 1 wherein the glycol component of the copolyester of (i) is about 35-65 mol % 1,6-hexanediol and 35-65 mol % ethylene glycol.

9. The composition of claim 1 wherein the acid component of the copolyester of (i) comprises at least about 90 mol % 4,4'-biphenyldicarboxylic acid and less than about 10 mol % of at least one other aromatic dicarboxylic acid having up to 20 carbon atoms; and the glycol component comprises less than about 10 mol % of at least one other aliphatic glycol having 3 to 20 carbon atoms.

10. The composition according to claim 9 wherein said other dicarboxylic acid is terephthalic acid, isophthalic acid, 1,5-naphthalenedicarboxylic acid, 2,6-naphthalenedicarboxylic acid, 2,7-naththalenedicarboxylic acid, or trans-4,4'-stilbenedicarboxylic acid; said other aliphatic glycol is 1,2-propanediol, 1,3-propanediol, 1,4-butanediol, 1,5-pentanediol, cis-1,3-cyclohexanedimethanol, trans-cyclohexanedimethanol, cis-1,4-cyclohexanedimethanol, trans-1,4-cyclohexanedimethanol, or p-xylene glycol.

* * * * *